May 15, 1956　　　A. WINTHER　　　2,745,527
MAGNETIC FLUID MIXTURE CLUTCH
Filed Dec. 21, 1951　　　2 Sheets-Sheet 1

Anthony Winther,
Inventor.
Koenig and Pope,
Attorneys.

May 15, 1956 A. WINTHER 2,745,527
MAGNETIC FLUID MIXTURE CLUTCH
Filed Dec. 21, 1951 2 Sheets-Sheet 2

Anthony Winther,
Inventor.
Koenig and Pope,
Attorneys.

United States Patent Office 2,745,527
Patented May 15, 1956

2,745,527

MAGNETIC FLUID MIXTURE CLUTCH

Anthony Winther, Kenosha, Wis., assignor, by mesne assignments, to Eaton Manufacturing Company, Cleveland, Ohio, a corporation of Ohio Application December 21, 1951, Serial No. 262,779

6 Claims. (Cl. 192—21.5)

This invention relates to an improvement upon the apparatus shown in my United States Patent 2,543,394, and is a continuation-in-part of my copending United States patent application Serial No. 115,711, filed September 14, 1949, for Magnetic Clutch, and now abandoned.

The invention relates to magnetic clutches of the type in which a flowable magnetic material of magnetically variable shear strength is employed for closing a magnetic gap between magnetic members when a magnetic field is energized, the magnetic material being movable into a position physically to open the gap when the magnetic field is deenergized.

The invention has for its purposes the increasing of torque delivered per pound of weight of the apparatus, and the more effective use therein of dry, fluent magnetic material. This is accomplished by effecting a maximum compound of action of the clutch specified in said patent, without foregoing any of the advantages of the restricted movement of magnetic fluid accomplished during the action of said clutch between deenergized and energized conditions. Moreover, compounding is accomplished without the introduction of additional drag. This is accomplished by confining the magnetic material which is used, to a plurality of externally grooved annular confinements having externally grooved surfaces or superficies. Another object is to provide for maintaining an adequate distribution of the dry, fluent magnetic material between certain inner and outer magnetic gaps of the type described below and in said application. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a longitudinal half-section of a clutch embodying the invention, with parts broken away;

Similar reference characters indicate corresponding parts throughout the several views of the drawings.

The term "clutch" as used herein is intended to include brakes, a brake being broadly a clutch wherein one of the relatively rotary members is stationary. The terms "flowable" and "fluent" are to be considered as synonymous.

Figure 1:
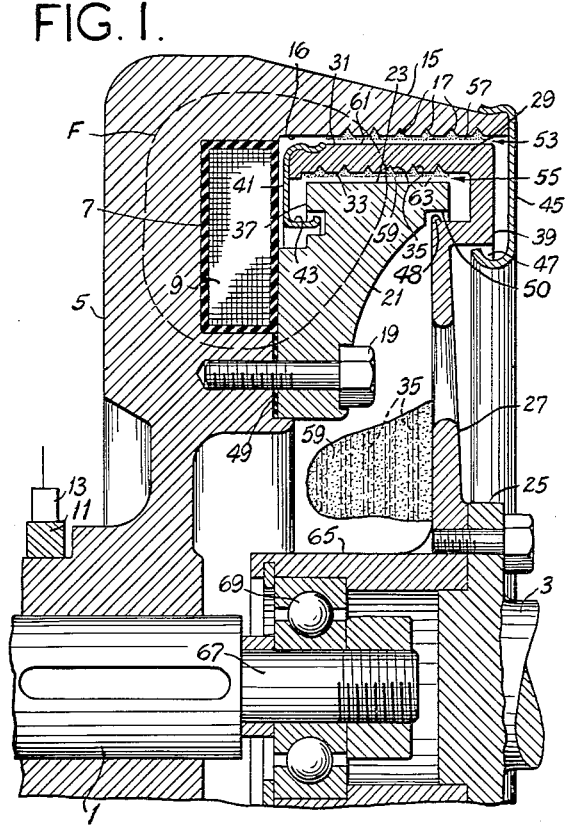
Figure 4:
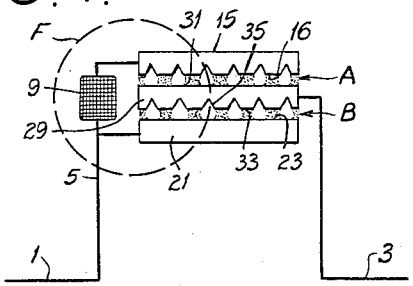
Fig. 4 is a diagrammatic view embodying the principal elements of Fig. 1, except that certain items are not shown, such as bearings, seals, et cetera.

Referring now more particularly to Figs. 1 and 4, there is shown at numeral 1 a drive shaft and at numeral 3 a driven shaft. The driving and driven relationship between these may be reversed. Keyed to the drive shaft 1 is a magnetic drum 5 composed of iron, soft steel or the like. In the drum 5 is a groove 7 which carries an annular field coil 9. One end of the wire of this coil is connected with a circuit leading through a slip ring 11 fed by a brush 13, the other end of the coil being grounded; or, if desired, a non-grounded circuit employing two slip rings may be used. Further details in this connection are unnecessary, inasmuch as the provision of circuits for field coils is well known in the art. The drum 5 is exteriorly cup-shaped and annular, as shown at 15, the inner wall of which is a smooth cylinder as shown at 16, except for the provision of spaced annular grooves or pockets 17.

Held to the bottom of the cup by means of bolts 19 is an inner magnetic annular ring 21 which serves to hold the coil 9 in position within the groove 7. A nonmagnetic ring 49 is interposed between the members 5 and 21, composed for example of mica. Exteriorly, the ring 21 is made of relatively smooth or uninterrupted cylindric form 23. It also carries an annular shoulder 37. Bolted to a flange 25 on the driven shaft 3 is a magnetic drum 27. Between its hub 65 and a suitable end 67 on shaft 1 is a pilot bearing 69. The drum 27 is formed as a cup having a cylindric or annular wall 29 which telescopes between the cylindric surfaces 16 and 23. The outer face of the wall 29 is relatively smooth or uninterrupted and cylindric, as shown at 31. Its inner wall is cylindric, as shown at 33, except for spaced annular grooves or pockets 35.

A magnetic gap of approximately .020 inch is left between cylindric walls 16 and 31, and 23 and 33, respectively. The drum 27 also carries a shoulder 39. The purpose of the shoulders 37 and 39 is to cooperate with sealing elements, one of which consists of a nonmagnetic ring 41 fastened to the inner edge of the wall 29 and providing an annular pocket-forming flange 43 adjacent the shoulder 37. The other sealing element consists of a nonmagnetic ring 45 attached to the rim of the wall 15 and providing a pocket-forming flange 47 adjacent the shoulder 39. Additionally there is a sealing flange 48 between drum 27 and a shoulder 50 on ring 21. There need be no direct engagement between the edges of the flanges 43, 47, 48 and shoulders 37, 39 and 50, respectively, a slight running clearance being preferably employed. As shown in Fig. 1, the innermost portion 47 of the sealing means 43, 47, 48 is at a distance from the outermost part of the outer magnetic gap between walls 16 and 31 which is a minor fraction of the radius from the center line of shaft 1 to said outermost part of the outer magnetic gap. For nonmagnetic properties, the rings 41 and 45 may be composed of aluminum, copper or the like. When the coil 9 is excited, a toroidal flux field F is generated which interlinks the members 5, 21, 29 and 15, intersecting the ring 49 and spanning the magnetic gaps at 53 and 55.

Figure 2:
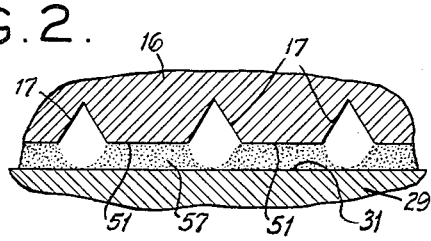
Fig. 2 is an enlarged longitudinal section showing conditions in a typical magnetic gap when the clutch is energized.
Figure 3:
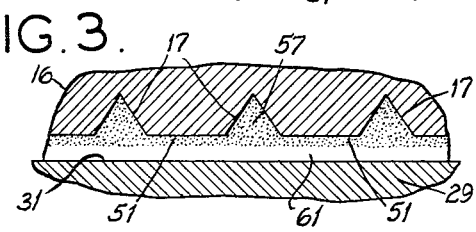
Fig. 3 is a view similar to Fig. 2, showing conditions when the clutch is deenergized.

As shown in Figs. 2 and 3, the grooves 17 and 35 provide annular lands 51. A satisfactory arrangement is one in which the widths of the lands 51 are of the order of twice the widths of the grooves 17 and 35, respectively, but this relationship is not to be taken as limiting.

Certain quantities of flowable magnetic material 57 and 59 are carried between the cylinders 16 and 31, and 23 and 33, respectively. It is preferable that this material be flowable but nonliquid, that is, like a grease, so that it will cling to any surface against which it is placed. For example, a silicone grease base may be used. Incorporated with the grease are iron particles in the ratio of 3:1 by weight of iron particles to grease. This mixture is deformable and flows under pressure but tends to adhere to any surface upon which it is placed.

The numbers and depths of the grooves 17 and 35 and the total amount of flowable material are such that under deenergized conditions of the coil 9 and rotation of the members 5 and 27, centrifugal force will result in the material taking up the position shown in Figs. 1 and 3, wherein it fills the grooves but an insufficient amount of material is left over to fill the spaces between the cylinders 16 and 31, and 23 and 33, respectively. The resulting air spaces are then shown at 61 and 63. The result is that the telescoped cylinders may rotate relatively without any frictional drag between them except an inconsequential amount due to windage.

When the coil 9 is excited, the toroidal flux field F will be generated, which interlinks as above stated. This passes through the air spaces 61 and 63 and through the material 57 and 59. It inductively magnetizes the magnetic material, causing it to move by attraction from the positions shown in Fig. 3 to the positions shown in Fig. 2. In the latter positions, it fills the cylindric spacings between the lands 51 and the adjacent cylinders. At the same time, the viscosity or shear properties of the flowable material are magnetically increased, so that after an initial period of shear under acceleration, it stiffens to form a solid connection under conditions wherein the members 15, 21 and 29 are in synchronism. At this time the grooves 17 and 35 are substantially empty. The reason for this is that the magnetic field is less strong when it crosses the grooves than where it crosses between the cylindric surfaces. When the coil 9 is deenergized, the field F disappears and the flowable material 57, 59 loses its magnetically stiffened properties and flows freely under centrifugal force from the position shown in Fig. 2 to the position shown in Fig. 3, wherein there is no physical connection between the driving and driven members. The result is the elimination of all viscous drag when the clutch is released, although the shear connections between them afforded by the magnetic material are of large extent when the clutch is energized and closed.

The purpose of the nonmagnetic ring 49 is to present a section of high reluctance against maintenance of the toroidal field F by residual magnetism when the magnetomotive force due to coil 9 disappears. Thus assurance is had that the flowable material 57, 59 will not continue to be inductively magnetized when the coil is deenergized and prompt non-dragging clutch release is effected when the coil 9 is deenergized.

From the above it will be seen that each driving and driven member carries both internally grooved cylinders and external smooth cylinders, the latter being spaced inside of the former by the sizes of the magnetic gaps chosen. A separate mass of flowable magnetic material is employed in each respective gap. Thus several improvements are accomplished. First, for a given gap area the clutch is approximately half as long as it would otherwise need to be, and hence this is true for a given torque. For example, in the case of an actual clutch 10½ inches in outside diameter and weight of 45 pounds, a torque of approximately 300 lb.-ft. has been obtained in practice.

Figure 5:
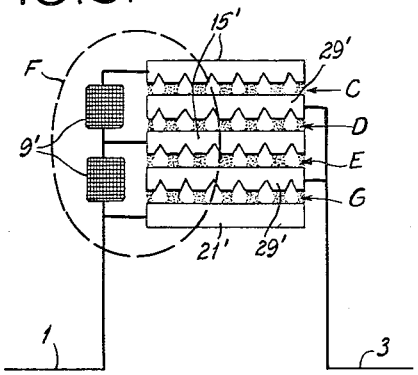
Fig. 5 is a view similar to Fig. 4, showing another embodiment of the invention.

In Fig. 5 is shown how capacity may be further increased by compounding the basic structures shown in Figs. 1 and 4. In this figure, primed numbers indicated parts analogous to those already described. For example, three magnetic cylinders 15′, 15′, 21′ are attached to the driver 1 and two magnetic cylinders 29′ are attached to the driven member 3. The cylinders 15′ and 29′ are all internally grooved and externally relatively smooth, the cylinder 21′ being externally relatively smooth. Two annular field coils 9′ may be used for producing the toroidal flux field interlinking these cylinders. The operation is the same as that already described, except that instead of the two annular confinements having externally grooved superficies as indicated at A and B in Fig. 4, there are four of these, as indicated at C, D, E and G in Fig. 5. This nearly doubles the capacity of the Fig. 4 machine and quadruples that of a machine such as shown in said Patent 2,543,394 without necessarily increasing its length. Moreover, it is clear that further compounding may be accomplished by multiplying the numbers of cylinders. However, as the number is increased, there will be a requirement that the diameter be increased because it is undesirable to have as few as possible of the operating elements operating close to the center of rotation, since for a given shear force the resulting moment arm will become smaller.

It should be noted in connection with Fig. 5 that the smooth and grooved surfaces and other details of the cylinders for simplicity have not been lettered, since their identification and functions are obvious from the above.

Figure 6:
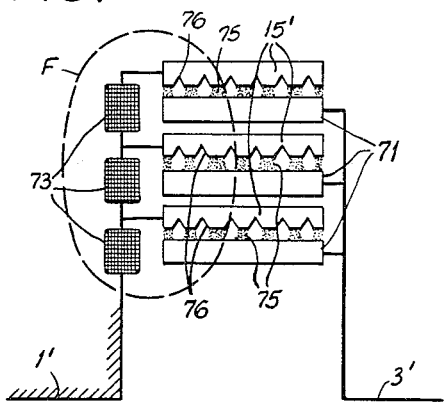
Fig. 6 is a view similar to Figs. 4 and 5, showing an embodiment applicable to a brake.

In Fig. 6 is shown a form of the invention particularly applicable to brakes. In this case, only the member 3′ is rotary and the member 1′ is a fixed element. Member 1′ carries the cylinders 15′, 15′, 15′; also field coils 73 for providing the toroidal flux field F. These cylinders 15′ are smooth outside and grooved internally. Rotary element 3′ (to be braked) carries magnetic cylinders 71, which are smooth inside and outside. In this case the flowable magnetic material forms a shearing connection between members 1′ and 3′ as the coils 73 are energized, which has the effect of decelerating element 3′. This material 75 is inserted only between pairs of surfaces, one of which is grooved, as indicated by numeral 76. Thus if before element 3′ stops the coils 73 are deenergized, the flowable material will be slung toward the grooved surfaces. If element 3′ is brought to a stop and coils 73 deenergized, it is of course necessary to break through the fluid film in order again to start 3′, which involves a temporary drag. However, this drag does not occur for long, since the magnetic material will soon be slung from the exterior surfaces of the drum 71.

It should be understood, on the other hand, that the Figs. 1, 4 and 5 constructions may also be used as brakes by making one of the members 1 or 3 stationary.

It is clear that each magnetic gap of the apparatus constitutes an annular confinement for the magnetic mixture, and that the external surface of each confinement is constituted by a pocketed annular surface forming lands. The relationship between the volumes of the confinements, pockets and mixture is such that upon deenergization of the field the volume of mixture is insufficient under centrifugal force to fill the pockets and the gaps, but upon energization it will leave the pockets and connect between the surfaces at the lands.

Referring now to Figs. 7–10, there is shown a form of the invention for use with dry, flowable or fluent magnetic mixtures. In these views, like reference numerals designate like parts. In this form of the invention, the sealing arrangement 37, 41, 43 is eliminated. The magnetic drum 27 is provided with a sloping passage 81 in the shoulder 39. This pocket slopes down and away from the gap 61 and has an outer inlet 83 and an inner outlet 85. Leading from the inlet 83 and sloping across the drum 27 and leading across the surface 31 is a groove 87, behind which is a lip forming a plow 89. This arrangement provides a channel across the surface 31, leading to the passage 81. It will be understood that when slip takes place between the driving member 5 and the drum 27, the relative movement (or overrun) is as indicated by the curved arrow H in Figs. 9 and 10. Thus any material in the gap tends to be plowed across the surface 31 toward the inlet 83 and then directed downward through passage 81 and through the outlet 85. This serves to circulate material through and between the outer and inner gaps 61 and 63, as suggested by the arrow J in Fig. 8.

Figure 7:
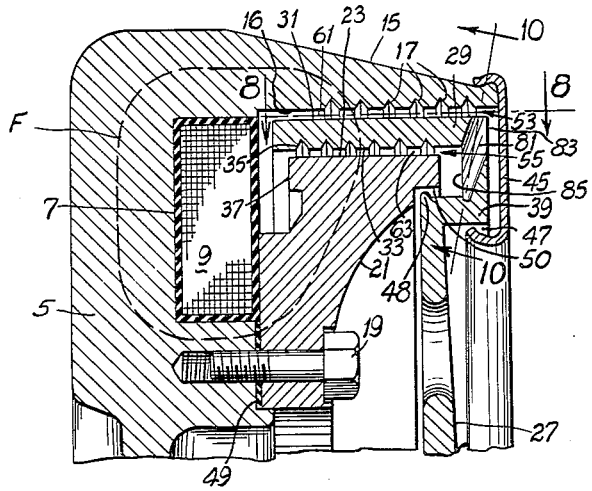
Fig. 7 is a fragmentary view similar to Fig. 1 but taken on line 7—7 of Fig. 9, showing a development of the invention for use with dry, fluent magnetic material, a showing of the material being omitted from Fig. 7 for better illustration.
Figure 9:
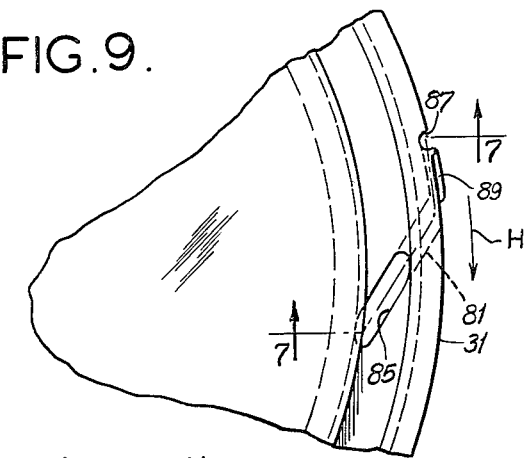
Fig. 9 is a left end view of Fig. 8, viewed from line 9—9 thereon.
Figure 8:
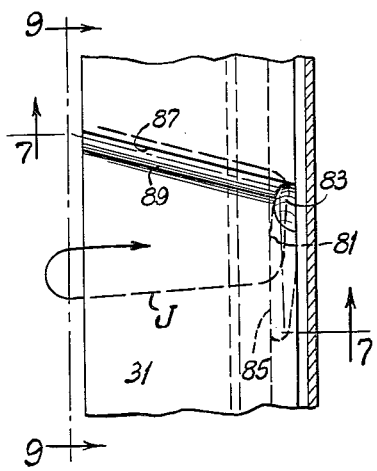
Fig. 8 is a developed view of the surface of a cup member, being viewed on line 8—8 of Fig. 7.
Figure 10:
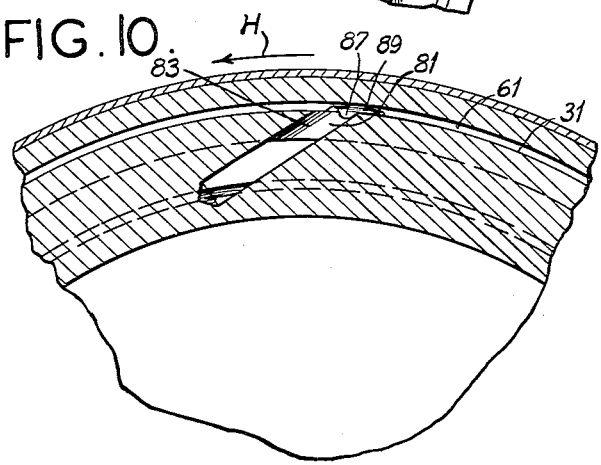
Fig. 10 is a fragmentary oblique section taken on line 10—10 of Fig. 7.

An important use of this construction is in connection with a dry, flowable or fluent magnetic material such as disclosed in the United States Patent 2,519,449 of Howard J. Findley. For example, a useful material is a 50–50 mixture, as measured by volume, of Carbonyl-E powdered iron and graphite. The graphite acts as a lubricant for the powdered iron. The Carbonyl-E iron may have a grain size of about 8 microns and the graphite may be of the order of 200 mesh. The proportions may be varied widely, as also the mesh of the particles. So far as magnetic coupling effects are concerned, this material acts not unlike that already described in connection with Figs. 1–6 herein, i. e., it is fluent when magnetically unexcited, but by variable excitation of the coil 9 it may be magnetically excited so as to be stiffened. This provides something like pillars or columns lying in the flux paths, so that the parts on opposite sides of the gaps 61 and 63 are mechanically and frictionally connected either with or without slip, depending upon the degree of excitation of coil 9. The amount of material used is regulated as described in Figs. 1–6. That is, when the coil 9 in Fig. 7 is unexcited, appearances are as shown in Fig. 3, and when excited as in Fig. 2. The material has not been shown in Fig. 7, because the description is thus clearer.

When the coil 9 in Fig. 7 is deexcited, the drum 5 will overrun the drum 27. The dry, fluent material will then exist in its fluent state, and due to overrun, as indicated at arrow H, will be carried along in the gaps 61 and 63. Since it is under centrifugal force, it is movable from the gap 63 to the gap 61. By means of the groove 87, plow 89 and passage 81, a circulation is set up wherein the material circulates (Fig. 7) to the right in outside gap 61 down through the passage 81, to the left through inside gap 63, returning outward to gap 61. Hence when the coil 9 is subsequently excited in order to convert the material from its fluent nature into more or less of a solid nature for effecting coupling, the material is distributed in the two gaps 61 and 63 for optimum operation along the lines already discussed in connection with the operation of Figs. 1–6.

It will be understood that the type of fluent magnetic material described in connection with Figs. 7–10 may be used in the structure shown in Figs. 1–6, and that the type of fluent material described in connection with Figs. 1–6 may be used in connection with the construction shown in Fig. 7. Also, the multiple arrangements shown in Figs. 5 and 6 may be provided with the circulating structures similar to the one shown in Fig. 7.

It will also be understood that in the Fig. 7 form of the invention the relationships between sealing means, gaps and shaft center lines are like those shown in Fig. 1, namely, the distance from the innermost seal 47 to the outermost part of the outer gap between the surfaces 16 and 31 is a minor fraction of the distance between the center line of the apparatus and said outermost part of the outer gap.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A magnetic clutch comprising magnetic driving and driven members one of which is constituted by first and second spaced inner and outer magnetic cylinders concentric about a center line, said cylinders being joined at one end and having radially disposed portions at their other ends providing between them a radially disposed space, the other member comprising a third and intermediate concentric magnetic cylinder located in spaced telescopic relation between the first and second spaced cylinders to provide radially spaced inner and outer cylindric magnetic gaps, said intermediate cylinder being open where the first and second cylinders are joined, a radially disposed support for said intermediate cylinder at its other end and in part located in said radially disposed space, annular running sealing means respectively on opposite sides of said radially disposed support for the intermediate cylinder and forming seals respectively between said support and said radially disposed portions of the first and second cylinders, the periphery of the innermost one of said annular sealing means being at a radial distance from the outermost part of the outer gap which is a minor fraction of the distance from said center line to said outermost part of the outer gap so as to confine a limited annular space adjacent the magnetic gaps and to separate said confined space from the remaining space occupied by the centrally located portions of the clutch, a fluent magnetic material movable in said gaps and in said confined space, and an annular field coil carried by said first and second cylinders near where they are joined and adapted to establish a magnetic flux field across said magnetic gaps.

2. A magnetic clutch comprising a shaft, magnetic driving and driven members, one of which is constituted by an assembly of spaced inner and outer magnetic cylinders and the other of which is constituted by an intermediate cylinder telescoping said spaced cylinders to provide inner and outer magnetic gaps around the center line of said shaft, the intermediate cylinder being provided with means at its opposite ends to form spaces at the ends of the inner gap, the outer cylinder being formed with means at its opposite ends to form spaces at the opposite ends of the outer gap, annular running sealing means at one end of the intermediate cylinder adapted to separate the adjacent endwise spaces and the inner and outer gaps, additional annular running sealing means at the opposite end of the intermediate cylinder adapted to separate the adjacent endwise spaces and the inner and outer gaps, the outermost peripheral portion of each of said sealing means being at a substantial distance from the shaft so as to minimize the volumes of said endwise spaces, separate masses of flowable magnetic material confined to the respective gaps and their respective adjacent endwise spaces, and an annular field coil carried upon said assembly adapted to establish a magnetic flux field across said magnetic gaps.

3. A magnetic clutch comprising a shaft, magnetic driving and driven members, one of which is constituted by an assembly of spaced inner and outer magnetic cylinders and the other of which is constituted by an intermediate cylinder telescoping said spaced cylinders to provide inner and outer magnetic gaps around the center line of said shaft, the intermediate cylinder being provided with means at its opposite ends to form spaces at the ends of the inner gap, the outer cylinder being formed with means at its opposite ends to form spaces at the opposite ends of the outer gap, annular running sealing means between one end of the intermediate cylinder and the adjacent portions of the inner and outer cylinders, the innermost portions of said sealing means being at a distance from the outermost part of the outer magnetic gap which is a minor fraction of the distance from said center line to said outermost part of the outer magnetic gap so as to minimize the volumes of the adjacent endwise spaces, flowable magnetic material in the gaps and their adjacent endwise spaces, and an annular field coil carried upon said assembly and adapted to establish a magnetic flux field across said magnetic gaps.

4. A magnetic clutch comprising magnetic driving and driven members one of which is constituted by first and second spaced inner and outer magnetic cylinders concentric about a center line, said cylinders being joined at one end and having radially disposed portions at their other ends providing between them a radially disposed space, the other member comprising a third and intermediate concentric magnetic cylinder located in spaced telescopic relation between the first and second spaced cylinders to provide radially spaced cylindric magnetic gaps, said intermediate cylinder being open where the first and second cylinders are joined, a radially disposed support for said intermediate cylinder at its other end and in part located in said radially disposed space, annular running sealing means respectively on opposite sides of said radially disposed support for the intermediate cylinder and forming seals respectively between said support and said radially disposed portions of the first and second cylinders, the peripheries of said annular sealing means being at substantial radial distances from said center line adapted to confine a limited annular space adjacent the magnetic gaps and to separate said confined space from the remaining space occupied by the centrally located portions of the clutch, a fluent magnetic material movable in said gaps and in said confined space, and an annular field coil carried by said first and second cylinders near where they are joined and adapted to establish a magnetic flux field across said magnetic gaps, said other member having openings connecting the magnetic gaps, said openings forming a part of the confined space established by said annular sealing means.

5. A magnetic clutch comprising magnetic driving and driven members one of which is constituted by first and second spaced inner and outer magnetic cylinders concentric about a center line, said cylinders being joined at one end and having radially disposed portions at their other ends providing between them a radially disposed space, the other member comprising a third and intermediate concentric magnetic cylinder located in spaced telescopic relation between the first and second spaced cylinders to provide radially spaced cylindric magnetic gaps, said intermediate cylinder being open where the first and second cylinders are joined, a radially disposed support for said intermediate cylinder at its other end and in part located in said radially disposed space, annular running sealing means respectively on opposite sides of said radially disposed support for the intermediate cylinder and forming seals respectively between said support and said radially disposed portions of the first and second cylinders, the peripheries of said annular sealing means being at substantial radial distances from said center line adapted to confine a limited annular space adjacent the magnetic gaps and to separate said confined space from the remaining space occupied by the centrally located portions of the clutch, a fluent magnetic material movable in said gaps and in said confined space, an annular field coil carried by said first and second cylinders near where they are joined and adapted to establish a magnetic flux field across said magnetic gaps, and means carried on at least one of said driving or driven members adapted to circulate fluent material through the gaps.

6. A magnetic clutch comprising magnetic driving and driven members one of which is constituted by first and second spaced inner and outer magnetic cylinders concentric about a center line, said cylinders being joined at one end and having radially disposed portions at their other ends providing between them a radially disposed space, the other member comprising a third and intermediate concentric magnetic cylinder located in spaced telescopic relation between the first and second spaced cylinders to provide radially spaced cylindric magnetic gaps, said intermediate cylinder being open where the first and second cylinders are joined, a radially disposed support for said intermediate cylinder at its other end and in part located in said radially disposed space, annular running sealing means respectively on opposite sides of said radially disposed support for the intermediate cylinder and forming seals respectively between said support and said radially disposed portions of the first and second cylinders, the peripheries of said annular sealing means being at substantial radial distances from said center line adapted to confine a limited annular space adjacent the magnetic gaps and to separate said confined space from the remaining space occupied by the centrally located portions of the clutch, a fluent magnetic material movable in said gaps and in said confined space, an annular field coil carried by said first and second cylinders near where they are joined and adapted to establish a magnetic flux field across said magnetic gaps, and means carried on at least one of said driving or driven members adapted to circulate fluent material through the gaps, said circulating means being constituted by a plow element on the outside of said intermediate cylinder.

References Cited in the file of this patent

UNITED STATES PATENTS

| | | |
|---|---|---|
| 2,488,079 | De Lavaud et al. | Nov. 15, 1940 |
| 2,525,571 | Winther | Oct. 10, 1950 |
| 2,541,831 | Prince | Feb. 13, 1951 |
| 2,543,394 | Winther | Feb. 27, 1951 |
| 2,573,065 | Salemme | Oct. 30, 1951 |
| 2,604,964 | Winther | July 29, 1952 |
| 2,622,713 | Rabinow | Dec. 23, 1952 |

OTHER REFERENCES

Bureau of Standards Technical Report 1213, National Bureau of Standards, Washington, D. C.

Vickers Magneclutch Bulletin No. 6000. Vickers Electric Division—1815 Locust Street, St. Louis 3, Missouri. Copyright 1950 (Fig. 11, page 8).